(12) United States Patent
Bai et al.

(10) Patent No.: US 10,019,323 B1
(45) Date of Patent: Jul. 10, 2018

(54) METHOD AND SYSTEM FOR CONTAINER DATA RECOVERY IN A STORAGE SYSTEM

(71) Applicant: EMC Corporation, Hopkinton, MA (US)

(72) Inventors: Lan Bai, Chelsea, MI (US); Fabiano C. Botelho, Sunnyvale, CA (US); Mahesh Kamat, Milpitas, CA (US); Nitin Garg, Santa Clara, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 280 days.

(21) Appl. No.: 14/225,188

(22) Filed: Mar. 25, 2014

(51) Int. Cl.
G06F 17/30 (2006.01)
G06F 11/14 (2006.01)

(52) U.S. Cl.
CPC ...... *G06F 11/1464* (2013.01); *G06F 11/1453* (2013.01)

(58) Field of Classification Search
CPC .................. G06F 11/1464; G06F 11/1453
See application file for complete search history.

(56) References Cited

U.S. PATENT DOCUMENTS

| 8,185,505 B1* | 5/2012 | Blitzer | G06F 11/1458 |
| | | | 707/610 |
| 9,116,848 B1* | 8/2015 | Jordan | G06F 11/1453 |
| 2006/0047925 A1* | 3/2006 | Perry | G06F 11/1474 |
| | | | 711/162 |
| 2009/0125671 A1* | 5/2009 | Flynn | G06F 9/52 |
| | | | 711/103 |
| 2010/0169622 A1* | 7/2010 | Nguyen | G06F 9/3863 |
| | | | 712/228 |
| 2011/0066808 A1* | 3/2011 | Flynn | G06F 12/0246 |
| | | | 711/118 |
| 2011/0154092 A1* | 6/2011 | Dash | G06F 11/0709 |
| | | | 714/2 |
| 2011/0167096 A1* | 7/2011 | Guo | G06F 3/067 |
| | | | 707/816 |
| 2011/0231362 A1* | 9/2011 | Attarde | G06F 11/3442 |
| | | | 707/609 |
| 2011/0302446 A1* | 12/2011 | Becker-Szendy | G06F 11/1076 |
| | | | 714/6.1 |
| 2012/0079499 A1* | 3/2012 | Gold | G06F 3/0607 |
| | | | 718/105 |

(Continued)

*Primary Examiner* — Jared M Bibbee
(74) *Attorney, Agent, or Firm* — Womble Bond Dickinson (US) LLP

(57) ABSTRACT

A computer-implemented method is disclosed. The method starts with determining a first container of a storage system is invalid. The method continues with the storage system setting a data recovery state for the first container to be en-queue, which indicates that data of at least one of the data segments needs to be recovered from the first container, and executing a process to recover any container having an en-queue data recovery state, and for each of the containers, to recover any valid data segment from the corresponding container. The process includes scanning the data segments of the first container to find valid data segments, moving or replicating the valid data segments to a second container, and setting the data recovery state for the first container to be complete once all the valid data segments are moved or replicated to the second container.

9 Claims, 8 Drawing Sheets

(56) References Cited

U.S. PATENT DOCUMENTS

| | | | |
|---|---|---|---|
| 2012/0084627 A1* | 4/2012 | Post | G06F 11/1048 714/763 |
| 2012/0158670 A1* | 6/2012 | Sharma | G06F 3/0608 707/692 |
| 2012/0198174 A1* | 8/2012 | Nellans | G06F 12/0804 711/133 |
| 2013/0086007 A1* | 4/2013 | Bandopadhyay | G06F 17/30156 707/692 |
| 2013/0332660 A1* | 12/2013 | Talagala | G06F 12/0246 711/103 |
| 2014/0006853 A1* | 1/2014 | Dudgeon | G06F 11/1435 714/15 |
| 2014/0279941 A1* | 9/2014 | Atkisson | G06F 17/30371 707/690 |
| 2014/0380097 A1* | 12/2014 | Dudgeon | G06F 11/1435 714/21 |
| 2015/0169420 A1* | 6/2015 | Shapira | G06F 12/1045 714/6.2 |

\* cited by examiner

METHOD AND SYSTEM FOR CONTAINER DATA RECOVERY IN A STORAGE SYSTEM

FIELD OF THE INVENTION

Embodiments of the present invention relate generally to storage systems. More particularly, embodiments of the invention relate to container data recovery in a content-addressable storage system.

BACKGROUND

Data storage is a critical component for computing. In a computing device, there is a storage area in the system to store data for access by the operating system and applications. In a distributed environment, additional data storage may be a separate device that the computing device has access to for regular operations. These data storages are generally referred to as storage systems.

Data are stored in data container in a storage system. Traditionally, when a container fails data integrity check and is marked as invalid, the whole container becomes useless. However, an invalid container may still have portion of data being valid and should not be discarded. Typically the storage system is then taken offline, and data recovery is carried out for the invalid container. Taking storage system offline is time consuming and interrupts services of the storage system, and a better mechanism is preferable.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
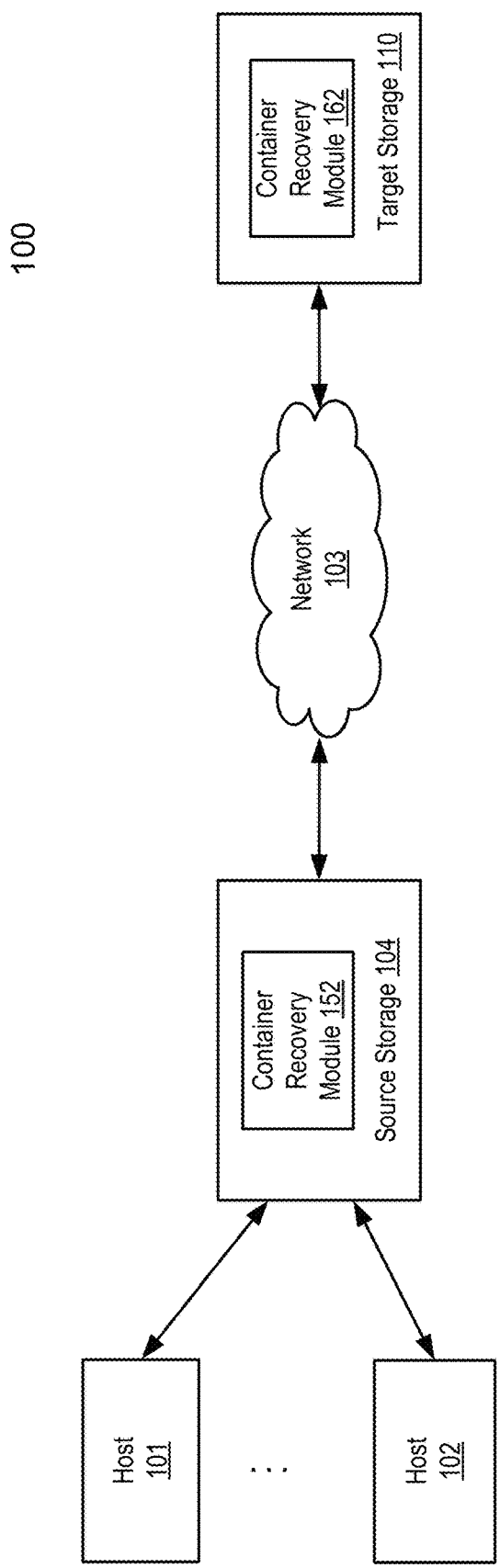
FIG. 1 is a block diagram illustrating a system in which container data recovery is performed according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other. A "set," as used herein refers to any positive whole number of items including one item.

According to some embodiments, a computer-implemented method is disclosed. The method starts with determining a first container of a storage system is invalid, where the first container contains at least a corrupted or missing data segment, where the first container stores data segments of the storage system having a plurality of containers, and each have a plurality of data segments stored therein. The method continues with the storage system setting a data recovery state for the first container to be en-queue, which indicates that data of at least one of the data segments needs to be recovered from the first container (e.g., the container fails data integrity check and the data inside it cannot be accessible until recovered), and executing a process to recover any container having an en-queue data recovery state, and for each of the identified containers having an en-queue data recovery state, to recover any valid data segment from the corresponding container. The process includes scanning the data segments of the first container to find valid data segments, moving or replicating the valid data segments to a second container, and setting the data recovery state for the first container to be complete once all the valid data segments are moved or replicated to the second container.

According to some embodiments, a storage system is disclosed. The storage system contains a memory configured to store data and instructions and a processor configured to execute a deduplication storage engine stored in the memory. The deduplication storage engine is configured to determine that a first container of a storage system is invalid, where the first container contains at least a corrupted or missing data segment, where the first container stores data segments of the storage system having a plurality of containers, and each have a plurality of data segments stored therein. The deduplication storage engine is further configured to (1) set a data recovery state for the first container to be en-queue, which indicates that data of at least one of the data segments needs to be recovered from the first container and (2) execute a process to recover any container having an en-queue data recovery state, and for each of the identified containers having an en-queue data recovery state, to recover any valid data segment from the corresponding container. The process includes scanning the data segments of the first container to find valid data segments, moving or replicating the valid data segments to a second container, and setting the data recovery state for the first container to be complete once all the valid data segments are moved or replicated to the second container.

According to some embodiments, a non-transitory computer-readable medium having instructions stored therein is disclosed. The medium when executed by a processor, causes the processor to perform operations. The operations includes determining a first container of a storage system that is invalid, where the first container contains at least a corrupted or missing data segment, where the first container stores data segments of the storage system having a plurality of containers, and each have a plurality of data segments stored therein. The operations continues with the storage system setting a data recovery state for the first container to be en-queue, which indicates that data of at least one of the data segments needs to be recovered from the first container, and executing a process to recover any container having an en-queue data recovery state, and for each of the identified containers having an en-queue data recovery state, to recover any valid data segment from the corresponding container. The process includes scanning the data segments of the first container to find valid data segments, moving or replicating the valid data segments to a second container, and setting the data recovery state for the first container to be complete once all the valid data segments are moved or replicated to the second container.

FIG. 1 is a block diagram illustrating a system in which container data recovery is performed according to one embodiment of the invention. Referring to FIG. 1, system 100 includes, but is not limited to, one or more hosts 101-102 communicatively coupled to source storage system 104 and target storage system 110 over network 103. The target storage system may be a replication system or an archive system. Hosts 101-102 may be any type of hosts such as a server, a personal computer (e.g., desktops, laptops, and tablets), a "thin" client, a personal digital assistant (PDA), a Web enabled system, a gaming device, a media player, or a mobile phone (e.g., Smartphone), etc. Network 103 may be any type of network such as a local area network (LAN), a wide area network (WAN) such as Internet, a corporate intranet, a metropolitan area network (MAN), a storage area network (SAN), a bus, or a combination thereof, wired and/or wireless.

Both source storage system 104 and target storage system 110 may represent any type of server or cluster of servers. For example, source storage system 104 and target storage system 110 may be a storage server used for any of various different purposes, such as to provide multiple users with access to shared data and/or to back up mission critical data. Source storage system 104 and target storage system 110 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Source storage system 104 and target storage system 110 may have a distributed architecture, or all of its components may be integrated into a single unit. Note source storage system 104 and target storage system 110 may have different replication performance characteristics even when they have similar architecture. Source storage system 104 is implemented as part of an archive and/or backup storage system such as a deduplicated storage system available from EMC® Corporation of Hopkinton, Mass. Target storage system 110 may also be implemented as a deduplicated storage system in some embodiments.

Figure 2:
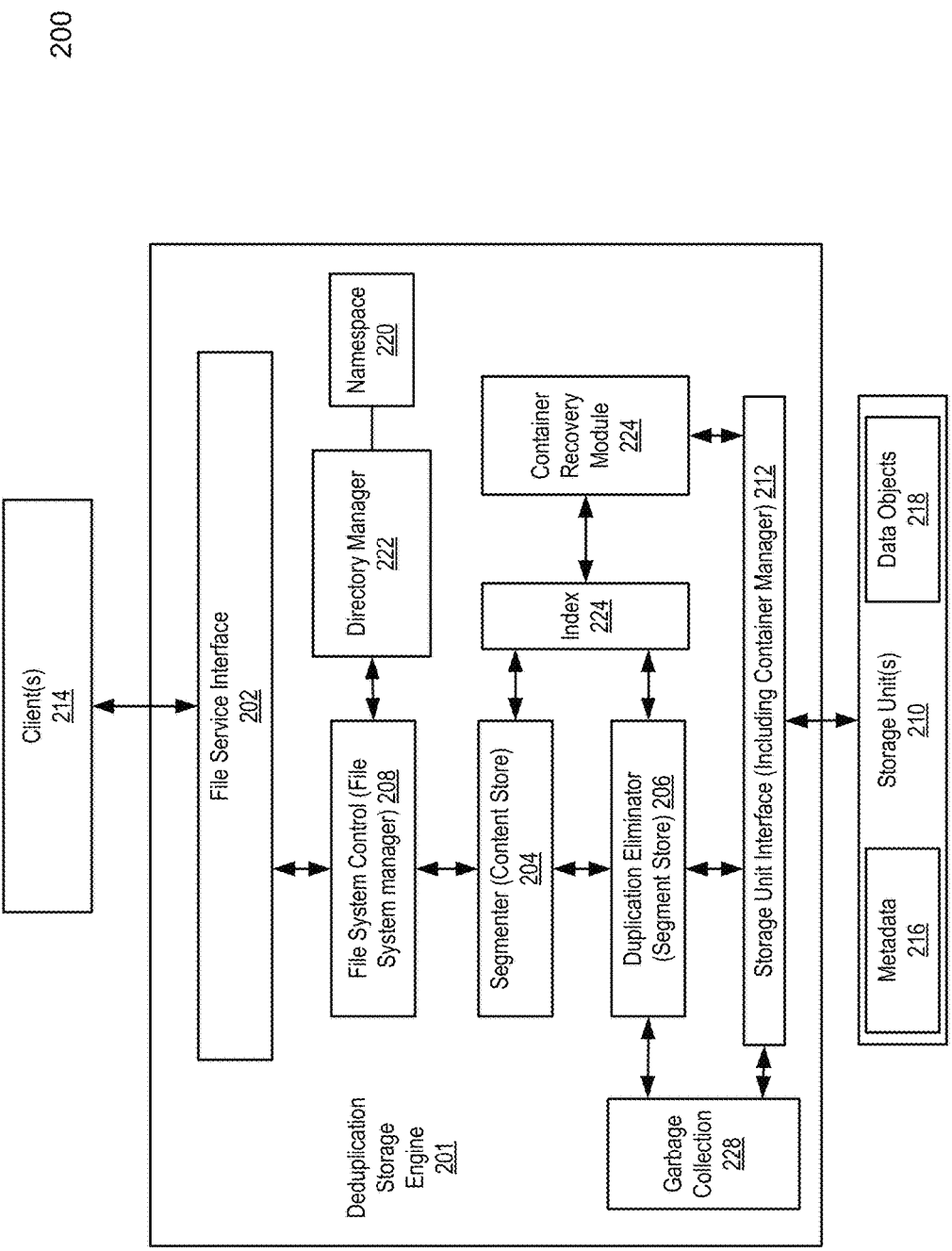
FIG. 2 is a block diagram illustrating a deduplicated storage system according to one embodiment of the invention.

Source storages 104 and target storage 110 contain container recovery modules 152 and 162 respectively. Each container recovery module is configured to perform container recovery at the respective storage system. The embodiments of the invention can be applied to storage systems such as a source storage system, a target storage system, or a backup storage system. In addition, FIG. 2 is a block diagram illustrating a deduplicated storage system according to one embodiment of the invention. The deduplicated storage system 200 may be a detail implementation of deduplicated source storage system 104 or target storage system 110 illustrated in FIG. 1.

The deduplicated storage system 200 interfaces one or more clients 214 with one or more storage units 210 storing metadata 216 and data objects 218. Clients 214 may be any kinds of clients, such as, for example, a client application (e.g., from hosts 101/102 of FIG. 1), backup software, or a garbage collector, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage units (sometimes referred to as storage devices) 210 may be implemented locally (e.g., single node operating environment) or remotely (e.g., multi-node operating environment) via an interconnect, which may be a bus and/or a network (e.g., a storage network). In one embodiment, one of storage units 210 operates as an active storage to receive and store external or fresh user data from a client (e.g., an end-user client or a primary storage system associated with one or more end-user clients), while another one of storage units 210 operates as a target storage unit to periodically archive data from the active storage unit according to an archiving policy or scheme. Storage units 210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 210 may also be combinations of such devices. In the case of disk storage media, the storage units 210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 216, may be stored in at least some of storage units 210, such that files can be accessed independent of another storage unit. Metadata of each storage unit includes enough information to provide access to the files it contains. In one embodiment, metadata may include fingerprints (e.g., checksum of data) contained within data objects 218, where a data object represents containers, which contains one or more compression regions (CRs) of one or more data chunks, CRs, or data chunks. Each data chunk is a fragment of data block and data chunks are processed and stored in the deduplicated storage system, and data chunk is a common form of data segment. Fingerprints are mapped to a particular data object via metadata 216, enabling the system to identify the location of the data object containing a data chunk represented by a particular fingerprint. A fingerprint may be generated based on at least a portion of a data chunk, for example, by applying a predetermined mathematical algorithm (e.g., hash function) to at least a portion of the content of the data chunk. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, metadata 216 may include a file name, a storage unit identifier (ID) identifying a storage unit in which the chunks associated with the file name are stored, reconstruction information for the file using the chunks, and any other appropriate metadata information. Metadata 216 may further include a chunk ID, a chunk sketch, a hash of a chunk, an encrypted hash of a chunk, random data, or any other appropriate metadata. In some embodiments, metadata associated with a chunk is used to identify identical and/or similar data segments. The stored metadata enables a faster identification of identical and/or similar data chunks as an ID and/or sketch (e.g., a set of values characterizing the chunk) do not need to be recomputed for the evaluation of a given incoming data segment.

In one embodiment, a chunk ID includes one or more deterministic functions of a data chunk, one or more hash functions of a data chunk, random data, or any other appropriate data chunk ID. In various embodiments, a data chunk sketch includes one or more deterministic functions of a data chunk, one or more hash functions of a data chunk, one or more functions that return the same or similar value for the same or similar data chunks (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a chunk. For example, a sketch may be generated by applying one or more functions (e.g., hash functions) on a chunk and a subset of the results of the functions performed on the chunk (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, deduplication storage engine 201 includes file service interface 202, file system control 208, directory manager 222, namespace 220, segmenter 204, duplicate eliminator 206, index 224, garbage collection 228, container recovery module 226, and storage unit interface 212. Deduplication storage engine 201 receives a file or files (or data item(s)) via file service interface 202, which may be part of a file system namespace 220 of a file system associated with the deduplication storage engine 201. The file system namespace 220 is managed by directory manager 222. File service interface 202 supports a variety of protocols, including a network file system (NFS), a common Internet file system (CIFS), and a virtual tape library interface (VTL), etc.

The file(s) is/are processed by segmenter 204 and file system control 208. Segmenter 204, also referred to as a content store, breaks the file(s) into variable-length chunks based on a variety of rules or considerations. For example, the file(s) may be broken into chunks by identifying chunk boundaries. Chunk boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more chunks that originally made up a data block, data stream, file, or directory that was/were previously stored.

In some embodiments, chunks are segmented by identifying chunk boundaries that are content-based—for example, a hash function is applied to values of data within a sliding window through the data stream or block and when the hash function is equal to a value (or equal to one of several values) then a chunk boundary is identified. In various embodiments, chunk boundaries are identified using content based functions operating on windows within a data stream or block that have a minimum or maximum or other value or any other appropriate content based chunking algorithm. In various embodiments, chunks include fixed-length chunks, variable length chunks, overlapping chunks, non-overlapping chunks, chunks with a minimum size, chunks with a maximum size, or any other appropriate chunks. In various embodiments, chunks include files, groups of files, directories, a portion of a file, a portion of a data stream with one or more boundaries unrelated to file and/or directory boundaries, or any other appropriate chunk.

In one embodiment, file system control 208, also referred to as a file system manager, processes information to indicate the chunk(s) association with a file. In some embodiments, a list of fingerprints is used to indicate chunk(s) associated with a file. File system control 208 passes chunk association information (e.g., representative data such as a fingerprint) to index 224. Index 224 is used to locate stored chunks in storage units 210 via storage unit interface 212. Duplicate eliminator 206, also referred to as a segment store, identifies whether a newly received chunk has already been stored in storage units 210. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 210 that make up the file. Chunks are then packed by a container manager (which may be implemented as part of storage unit interface 212) into one or more storage containers stored in storage units 210. The deduplicated chunks may be further compressed into one or more CRs using a variation of compression algorithms, such as a Lempel-Ziv algorithm before being stored. A container may contain one or more CRs and each CR may contain one or more deduplicated chunks (also referred to deduplicated segments). A container may further contain the metadata such as fingerprints, sketches, type of the data chunks, etc. that are associated with the data chunks stored therein.

When a file is to be retrieved, file service interface 202 is configured to communicate with file system control 208 to identify appropriate chunks stored in storage units 210 via storage unit interface 212. Storage unit interface 212 may be implemented as part of a container manager. File system control 208 communicates (e.g., via segmenter 204) with index 224 to locate appropriate chunks stored in storage units via storage unit interface 212. Appropriate chunks are retrieved from the associated containers via the container manager and are used to construct the requested file. The file is provided via interface 202 in response to the request. In one embodiment, file system control 208 utilizes a chunk tree (e.g., a segment/chunk tree obtained from namespace 220) of content-based identifiers (e.g., fingerprints) to associate a file with data segments/chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure. Note that some or all of the components as shown as part of deduplication engine 201 may be implemented in software (e.g., executable code executed in a memory by a processor), hardware (e.g., processor(s)), or a combination thereof. For example, deduplication engine 201 may be implemented in a form of executable instructions that can be stored in a non-transitory machine-readable storage medium, where the instructions can be executed in a memory by a processor.

In one embodiment, storage system 200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Figure 3:
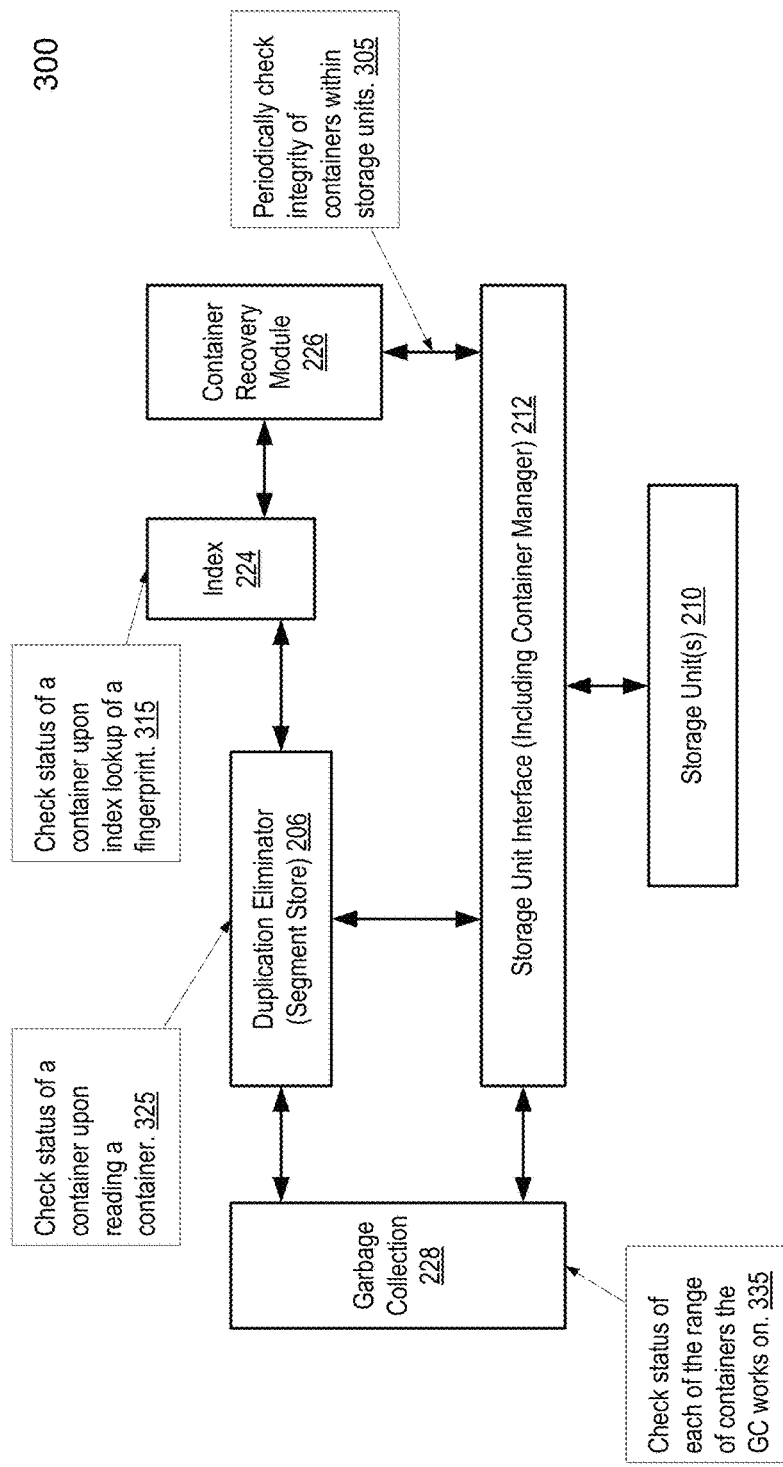
FIG. 3 illustrates interactions between the various modules in container data recovery according to one embodiment of the invention.

In one embodiment, container recovery module 226 interacts with index 224, duplicated eliminator 206, garbage collection 228, and storage unit interface 212 to recover invalid containers within storage units 210. According to one embodiment, an invalid container may contain an invalid segment or a compression region having an invalid segment stored therein. A variety of reasons may cause invalid containers, e.g., disk failure, memory error, software error, and etc. An invalid segment may be a missing segment from the container or a segment having corrupted data, but other components such as the file system index 224 indicates otherwise. An invalid segment may be a segment whose fingerprint does not match the one in the index 224. FIG. 3 illustrates interactions between the various modules in container data recovery according to one embodiment of the invention. System 300 may be a part of system 200 of FIG. 2 and the modules with the same number references indicating the same modules between the two figures.

Referring to FIG. 3, container recovery module 226 may periodically check integrity of containers within storage units 210 at reference 305. The operation is referred to as data scrubbing (or simply scrubbing). Scrubbing is a background operation, for example, via a thread executed in background that periodically checks or examines the integrity of containers. Scrubbing may find or identify a container being invalid through a variety of ways such as through checking a checksum of the container (e.g., determining the checksum is inconsistent with the data contained within the container). Once the scrubbing finds the invalid container, it sets a data recovery state for the invalid container to "en-queue." The state of en-queue means that data segments within the container needs to be recovered. The data recovery state for a container may also be "null" (when the container has not been set to be recovered) or "complete" (when the container has been recovered already) as discussed in more detail herein. The states of invalid containers may be maintained in a data structure, which may be maintained in the system memory or in a persistent storage. The data structure may be a hash table or other structure that can be used to quickly determine whether a particular container has already been enqueued for recovery in order to avoid recovering the same container multiple times.

The data recovery state for a container may also be set to en-queue by operations through index 224 at reference 315 upon performing fingerprint lookup. When a fingerprint of a data segment is passed to index 224, index 224 locates a container storing the data segment corresponding to the fingerprint. If the container is marked to be invalid by some other processes already, index 224 may cause the data recovery state for the container to be set to en-queue, which indicates that particular container is pending for data recovery. In one embodiment, index 224 locates multiple containers storing multiple data segments corresponding to the same fingerprint (note that multiple data segments corresponding to the same fingerprint may happen as deduplication does not happen for all data segments for a variety of reasons). If all of the multiple containers are marked to be invalid and their state are not complete, index 224 causes the data recovery state for one or all of the multiple containers to be set to en-queue. If all of the multiple containers are marked to be invalid but one of the multiple containers has the state complete, index 224 will look up the fingerprint again to check whether it has already been recovered. If the second lookup finds a valid container, index 224 returns the identifier of the valid container. Otherwise, if the second lookup cannot find a valid container, which implies a truly missing segment, index 224 returns an error indicating the queried fingerprint is missing. If one of the multiple containers is determined to be valid, index 224 returns an identifier of any of the valid containers without setting the data recovery state for these containers in this embodiment.

The data recovery state for a container may also be set en-queue by operations through duplication eliminator 206 at reference 325 upon reading the container. When duplication eliminator 206 reads a container through storage unit interface 212, storage unit interface 212 finds the container to be invalid, for example, by examining data integrity of the segments stored therein, it returns an error to duplication eliminator 206, and duplication eliminator 206 causes the data recovery state for the container to be set to en-queue. In addition, when deduplication eliminator 206 sends a fingerprint of a data segment to index 224, and the index 224 returns an error indicating no valid container existing for the fingerprint, duplication eliminator 206 may cause the data recovery state for the container associated with the error to be set to en-queue. Note the container may have already been set to en-queue state, in which case duplication eliminator 206 may opt to, for example, register a callback to receive a notification once the data recovery state for the container changes to a complete state. Upon receiving the notification, duplication eliminator may retry the read.

For containers with the data recovery state being set en-queue through operations 305-325, a process of data recovery generally is not executed on a container right after the data recovery state for the container is set en-queue. Instead, the data recovery process may be scheduled in batch on multiple containers having the data recovery state being set en-queue. The data recovery process may be ran when the system is not busy with higher priority processes, which may be user configurable.

In one embodiment, the data recovery process for a container with its data recovery state being set en-queue includes:

(1) Scanning the data segments of the container to find valid data segments. As discussed herein, a container may contain several compression regions (CRs) containing data segments. The CRs often contain validity indication such as check sum. If the checksum is correct for the CR, the data segments within the container are considered valid. If the checksum is wrong for the CR, each data segment within the CR is then decompressed and its validity is checked (for example, the validity can be determined based on comparing a check sum of the data segment and content of the data segment).

(2) Moving or copying the valid data segments to a different or new container; and (3) Setting the data recovery state for the container to be complete once all the valid data segements are moved to the different container.

Since the data recovery process triggered through operations 305-325 is not executed right after the data recovery state being set en-queue, the data recovery process sometimes is referred to as an asynchronous data recovery process. That is, a first process or thread for examining the integrity of a container and setting the state of the container to en-queue and a second process or thread for recovering the valid segments and setting the state of the container to complete may be executed independently and subject to different execution schedules or rules.

The data recovery state for a container may also be set en-queue by operations through garbage collection module 228 at reference 335. Garbage collection module 228 periodically checks containers and reclaims segments no longer in use by the storage system. Garbage collection module 228 works on a range of containers at a time, and it checks the validity of the container within the range of containers. When it identifies a container as invalid (e.g., through checking an "invalid" flag for a container, which is set by other processes such as through checking a checksum of the container (e.g., determining the checksum is inconsistent with the data contained within the container)), it sets a data recovery state for the invalid container to "en-queue." Then it performs a data recovery process at the container. As the data recovery process is executed right after the invalid container is identified, it sometimes is referred to as a synchronous data recovery process. The synchronous data recovery process runs through the steps similar to the ones of the asynchronous data recovery process. In addition, the synchronous data recovery process including:

(4) Copying content of the invalid container to a file. The copying operation is to minimize the risk of data loss due to a system bug in the data recovery process, and it also allows post-hoc analysis of the reasoning behind the container becoming invalid.

(5) Deleting the invalid container, for example, from the index; and (6) Reclaiming storage space and/or other related resources of the invalid container.

Garbage collection module 228 may also find a container with a data recovery state of complete, which indicate that valid data segments from the container have already been transferred to a different container. In that case, the steps (1)-(3) do not need to be performed, and only steps (4)-(6) need to be executed. In other words, garbage collection module 228 may determine that the data recovery state for a container is complete, and it then runs through steps (4)-(6) to reclaim the storage space.

Prior to deleting an invalid container, garbage collection module may check whether fingerprints associated with the invalid container are associated with any valid container. If a fingerprint is not associated with any valid container, the data segment with the fingerprint is reported missing.

Note the scrubbing process and garbage collection process may be run periodically according to a predefined schedule to identify invalid containers to recover. For example, the scrubbing processes may be scheduled for every 5-15 days. The interval between consecutive garbage collection processes may be set to be longer or shorter depends on implementation. An administrator associated with the storage system can configure such schedules via a user interface (e.g., Web interface or command line interface (CLI)). The operations associated with references 315 and 325 on the other hands are often executed at run-time, when data are read from storage unit(s) 210.

Figure 4:
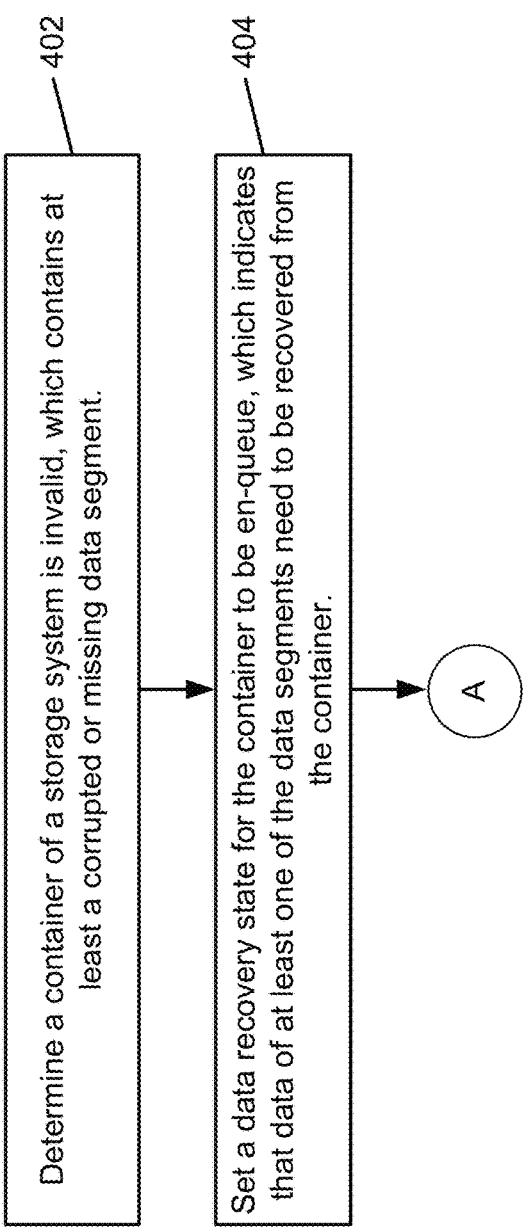
FIG. 4 is a flow diagram illustrating a process of setting data recovery state for a container according to one embodiment of the invention.

FIG. 4 is a flow diagram illustrating a process of setting data recovery state for a container according to one embodiment of the invention. Method 400 may be implemented in a storage system such as deduplicated storage system 200 of FIG. 2, particularly container recovery module 226. A storage system contains a number of containers, and each container has a number of data segments stored therein.

Method 400 starts at reference 402, where it is determined that a container of a storage system is invalid. Being invalid means that the container contains at least a corrupted or missing data segment. The container may be determined to be invalid through a variety of ways discussed in more details in associating to FIGS. 5A-C.

Then at reference 404, a data recovery state for the container is set to be en-queue. Being en-queue indicates that data of at least one of the data segments need to be recovered from the container (e.g., pending for recovery). The data recovery state for a container can also be null, which indicates the container has not being processed for data recovery and also is not slated to be processed for data recovery, or complete, which indicates that a data recovery process has been completed on the container.

The data recovery state information may be maintained in an in-memory hash table in one embodiment. The state information could get lost after a crash or reboot of the storage system, in which case a container may run through a data recovery process multiple time. It is generally acceptable as (1) crash or reboot of the storage system is rare, (2) the number of invalid containers is expected to be small, and (3) invalid containers may be deleted by periodical garbage collection process thus invalid containers will not stay in the storage system for a long period of time. Alternatively, such state information may be stored in a persistent storage device.

Figure 5A:
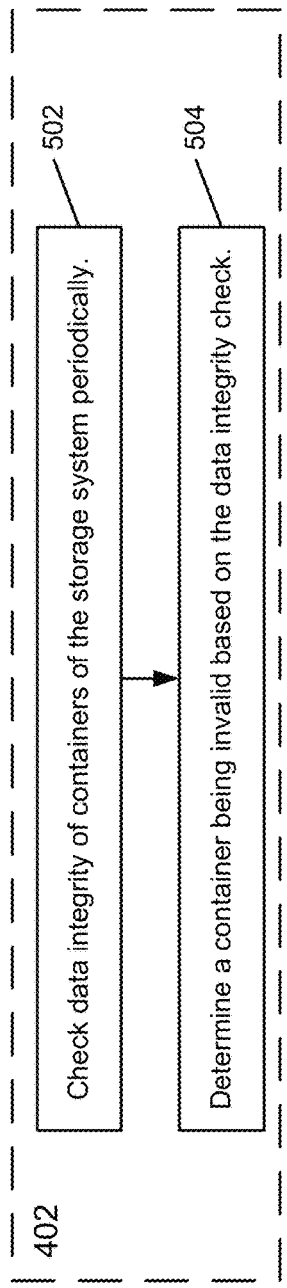
FIGS. 5A-5C are flow diagrams illustrating processes of en-queuing containers for data recovery according to embodiments of the invention.
Figure 5B:
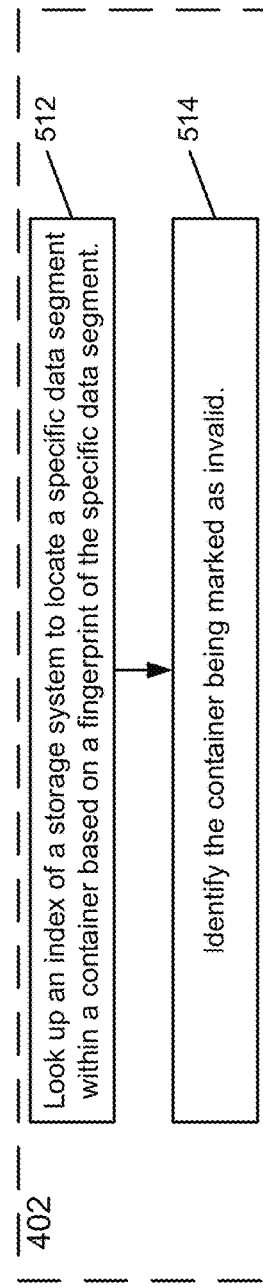
Figure 5C:
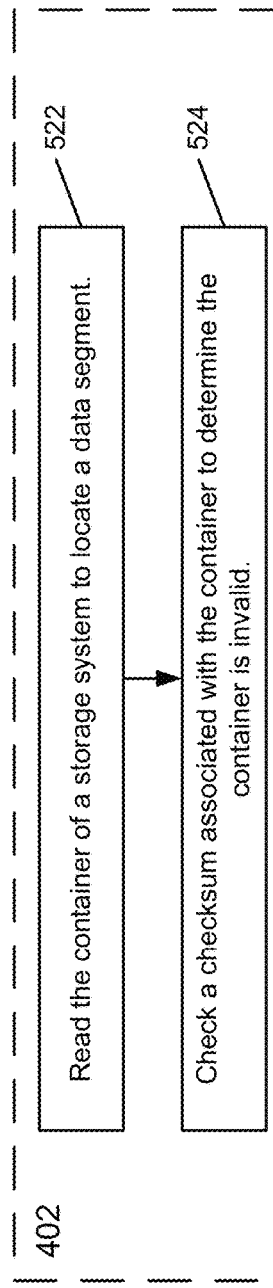

FIGS. 5A-5C are flow diagrams illustrating processes of en-queuing containers for data recovery according to embodiments of the invention. Each figure is an embodiment of reference 402 of FIG. 4, thus a dotted box of 402 covers each figure.

Referring to FIG. 5A, at reference 502, the storage system (through a container recovery module in one embodiment) checks data integrity of containers of the storage system periodically. Then at reference 504, it determines that a container being invalid based on the data integrity examination of the container. In one embodiment, the data integrity check determines whether a checksum associated with the container is valid. The storage system module may store the checksums of the containers and can compare the stored checksums to current checksums of the containers, and if they are inconsistent for a container, the container is invalid.

Referring to FIG. 5B, at reference 512, the storage system (through an index module in one embodiment) looks up an index of the storage system to locate a specific data segment within a container based on a fingerprint of the specific data segment. At reference 514, it identifies the container being marked or indicated as invalid. The container may be marked as invalid in index by a separate process. After the identification, an error is returned for the lookup including the container ID of the invalid container. When a fingerprint is mapped to data segments of multiple containers, the process determines whether or not all of the multiple containers are marked as invalid. If all of the containers are marked as invalid, the error returned for the lookup includes the container ID of one of the invalid container in one embodiment. As the storage system is reading data segment, it may not have time to indicate all of the invalid containers.

Referring to FIG. 5C, at reference 522, the storage system (through a duplication eliminator module in one embodiment) read a container to locate a data segment. Then at reference 524, it checks a checksum associated with the container and determines that the container is invalid.

In all the three cases, a data recovery state of the container determined to be invalid will set to an en-queue state unless it is already been set to complete state, so that possible valid data of the containers can be recovered.

Figure 6:
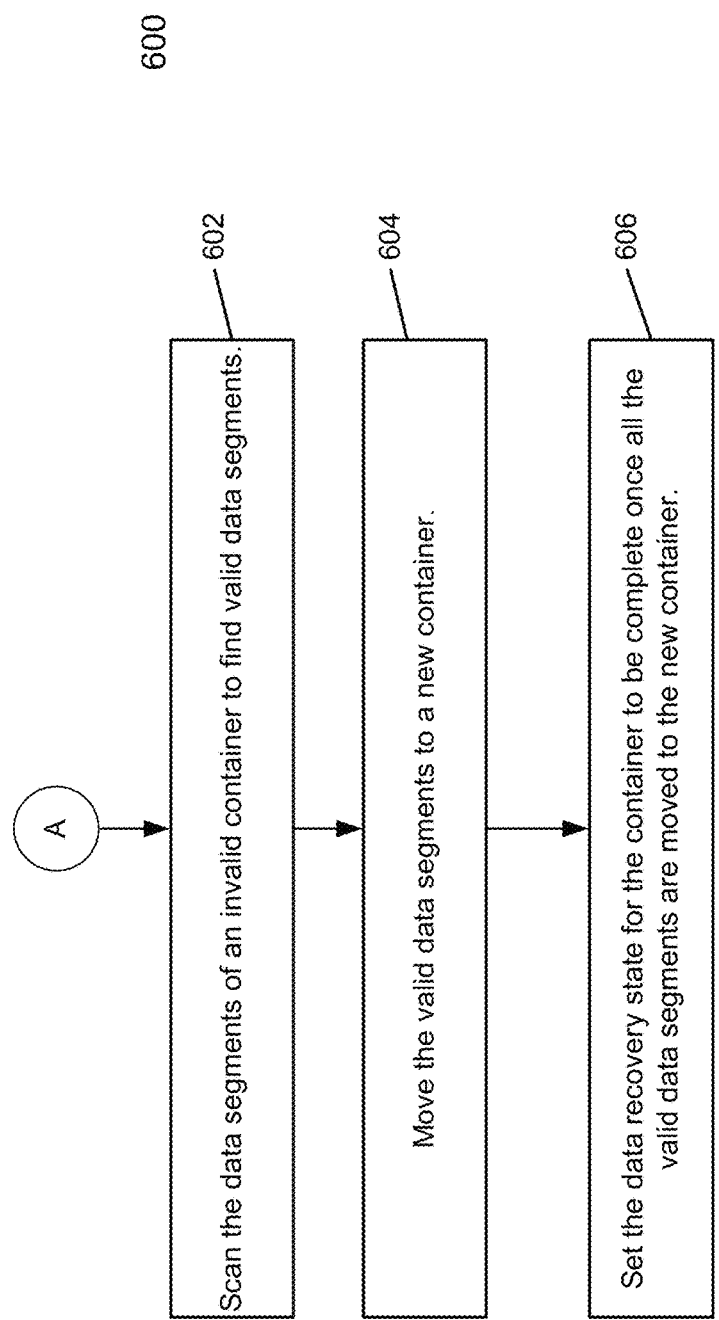
FIG. 6 is a flow diagram illustrating a data recovery process for an invalid container according to one embodiment of the invention.

FIG. 6 is a flow diagram illustrating a data recovery process for an invalid container according to one embodiment of the invention. Method 600 may be implemented in a storage system such as deduplicated storage system 200 of FIG. 2, particularly deduplication storage engine 201 (e.g., container recovery module 226 or garbage collection module 228). A storage system contains a number of containers, and each container has one or more compression regions and each compression region includes one or more data segments stored therein. Method 600 may be performed in a single process or thread similar to method 400 and right after the data recovery state of a container being set to be en-queue, in which case the data recovery process is referred to as a synchronous data recovery process. The synchronous data recovery process is often performed by garbage collection module. Method 600 may also be performed in a single process or thread similar to method 400 or a process or thread different from that of method 400. Method 600 may be performed independently with respect to method 400 on a particular container, thus it is referred to as an asynchronous data recovery process. The asynchronous data recovery process may be performed by container recovery module 226 in coordination with index 224 and deduplication eliminator 206.

At reference 602, the storage system scans the data segments of an invalid container to identify valid data segments. A container may contain several compression regions (CRs) containing data segments. The CRs often contain validity indication such as check sum. If the checksum is correct (e.g., matched) for the CR, the data segments within the container are considered valid. If the checksum is wrong (e.g., mismatched) for the CR, each data segment within the CR is then decompressed and its validity is checked (e.g., matching the actual data segments and their respective fingerprints).

At reference 604, the storage system moves or copies the valid data segment to a different or new container. At reference 606, the storage system sets the data recovery state for the container to be complete once all the valid data segements are moved to the different container.

When method 600 runs as an asynchronous data recovery process, the method completes after the data recovery state for the container to be complete. However, if the method run as a synchronous data recovery process, the storage system will delete the container and reclaim storage resources associated with the container for other usage.

Figure 7:
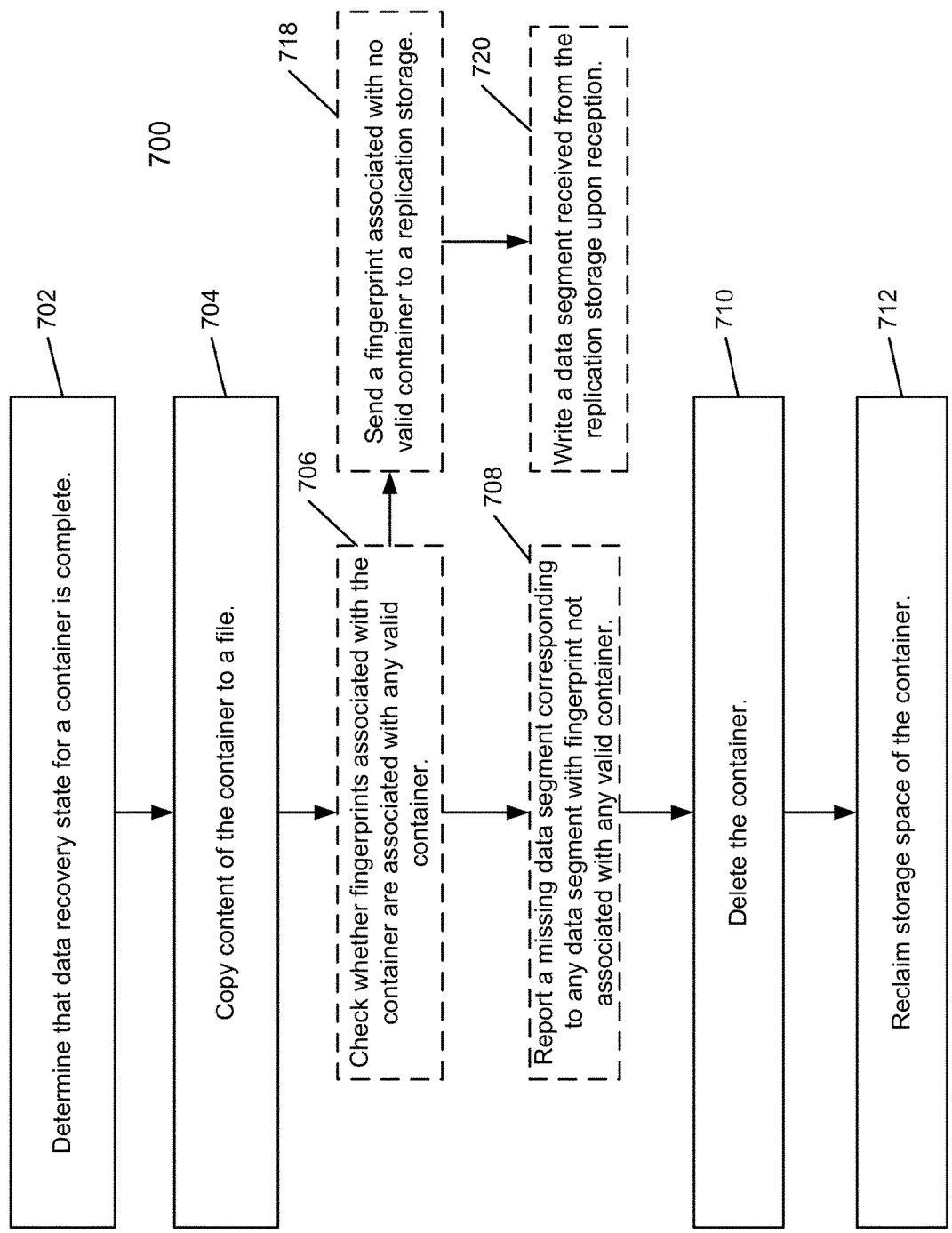
FIG. 7 is a flow diagram illustrating a process for deleting invalid container according to one embodiment of the invention.

Container deletion may be performed as an asynchronous data recovery process. FIG. 7 is a flow diagram illustrating a process for deleting invalid container according to one embodiment of the invention. Optional operations (at references 706 and 708) are denoted with dotted boxes. Method 700 may be implemented in a storage system such as deduplicated storage system 200 of FIG. 2, particularly garbage collection module 228.

At reference 702, the storage system determines that the data recovery state for a container is complete. Then at reference 704, the content of the container is copied to a file. The operation is to minimize the risk of data loss due to software bugs and to allow post-hoc analysis of data corruption.

Then optionally the storage system checks whether fingerprints associated with the container are associated with any valid container of the storage system at reference 706. At reference 708, the storage system reports a missing data segment corresponding to any data segment with fingerprint not associated with any valid container. A fingerprint maps to only invalid containers indicates a corrupted data segment. In embodiments of the invention, when a data segment is recovered, it would have been written to a new container, and a new mapping between its fingerprint and the new container would have been added to the index of the storage system (such as index 224) and the data segment would not be a corrupted data segment (thus not being reported as a missing data segment).

At reference 710, the storage system deletes the container of which the data recovery process has been performed and its state has been set to a complete state. The storage system then reclaims storage resources of the container at reference 712 for other usage.

Note for a synchronous data recovery process, garbage collection module may execute process containing operations in references 704-712 to delete invalid data containers after completing the data recovery process such as illustrated in FIG. 6.

Note after determining a container being invalid through a process illustrated in FIG. 4, a storage system may retrieve a corresponding valid container from its replication stored elsewhere if container replication is used. For example, if container recovery module 152 of source storage 104 of FIG. 1 determines that a container is invalid, it may request the corresponding valid container in target storage 110 to transfer over so that source storage 104 does not need to run a data recovery process illustrated in FIG. 6.

In an alternate embodiment, a storage system may retrieve only data a segment from its replication stored elsewhere for data recovery in a container. Referring to FIG. 7, at reference 706, garbage collection module 228 determines that a fingerprint is not associated with any valid container. At reference 718, the fingerprint is sent to its replication storage (e.g., if the storage system is source storage 104 of FIG. 1, the fingerprint is sent to target storage 110; while if the storage system is target storage 110, the fingerprint is sent to source storage 104). The replication storage then quires the fingerprint from its index (e.g., index 224 of FIG. 2). If the fingerprint maps to a valid container of the replication storage, the corresponding data segment is then read from the container and sent back to the storage system. The data segment is then written to the storage system up upon reception at the storage system at reference 720. The operations are feasible as the storage system is addressable at the segment level, and fingerprints of corrupted segments and the recovered segments may be transferred between replication storage and source storage. Therefore, the data recovery is more efficient than recovery by transferring a whole file or container.

Figure 8:
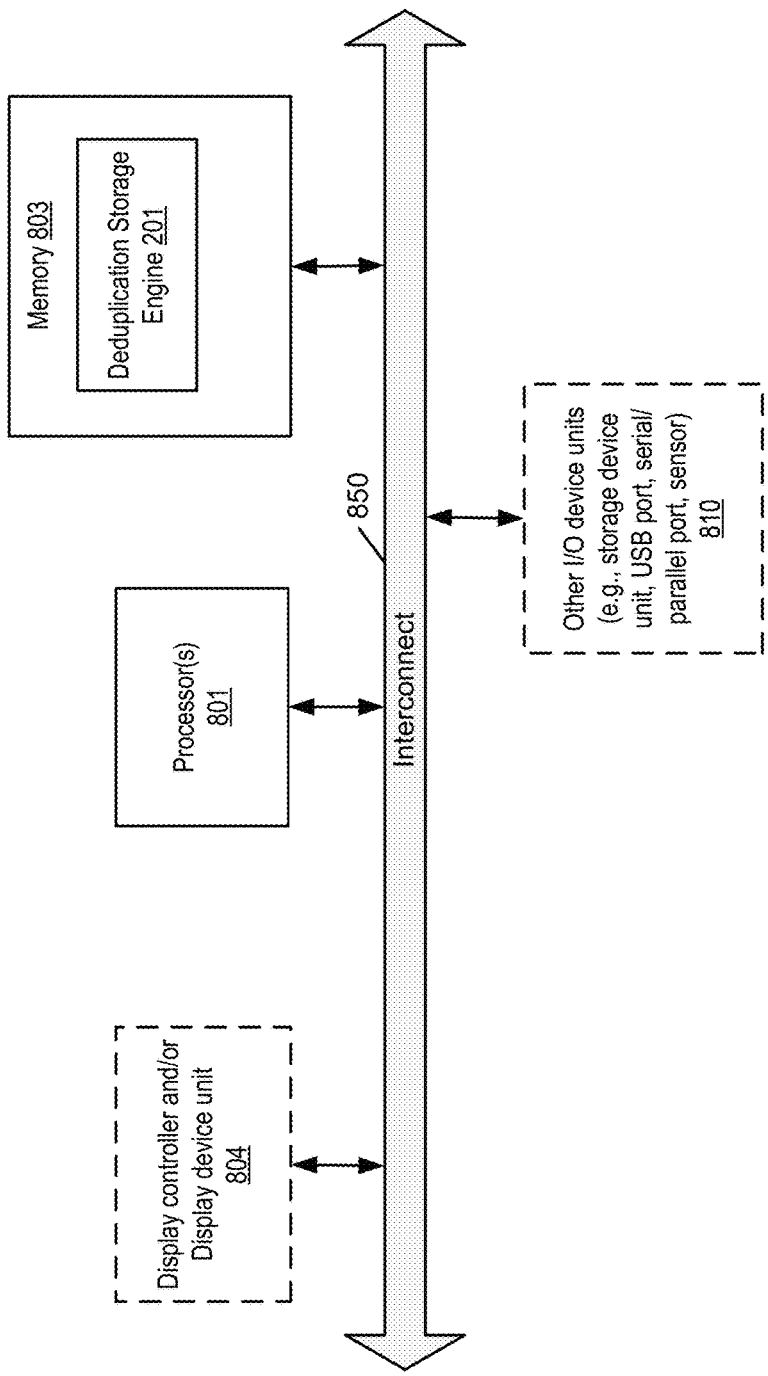
FIG. 8 is a block diagram illustrating a storage system that may be used with one embodiment of the invention.

FIG. 8 is a block diagram illustrating a storage system that may be used with one embodiment of the invention. For example, system 800 may represent any of the storage system described above performing any of the processes or methods described above. System 800 can include many different components, where optional components are illustrated with dotted boxes. These components can be implemented as integrated circuits (ICs), portions thereof, discrete electronic devices, or other modules adapted to a circuit board such as a motherboard or add-in card of a computing system, or as components otherwise incorporated within a chassis of the computing system. Note also that system 800 is intended to show a high level view of many components of the computing system. However, it is to be understood that additional components may be present in certain implementations and furthermore, different arrangement of the components shown may occur in other implementations.

In one embodiment, system 800 includes processor 801, memory 803, and device units 804-810 that are interconnected via a bus or an interconnect 850. Processor 801 may represent a single processor or multiple processors with a single processor core or multiple processor cores included therein. Processor 801 may represent one or more general-purpose processors such as a microprocessor, a central processing unit (CPU), or processing device. More particularly, processor 801 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 801 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 801 may communicate with memory 803, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 that will offer extensions to LPDDR2 to increase bandwidth. As examples, 2/4/8 gigabytes (GB) of system memory may be present and can be coupled to processor 801 via one or more memory interconnects. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector.

Memory 803 may include one or more volatile storage (or memory) devices such as random access memory (RAM), dynamic RAM (DRAM), synchronous DRAM (SDRAM), static RAM (SRAM), or other types of storage devices. Memory 1003 may store information including sequences of instructions that are executed by processor 1001, or any other device units. For example, executable code and/or data of a variety of operating systems, device drivers, firmware (e.g., input output basic system or BIOS), and/or applications can be loaded in memory 803 and executed by processor 801. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

To provide for persistent storage of information such as data, applications, one or more operating systems and so forth, a mass storage (not shown) may also couple to processor 801. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 801, e.g., via a serial peripheral interface (SPI). This flash device may provide for non-volatile storage of system software, including a basic input/output software (BIOS) as well as other firmware of the system.

In one embodiment, processor 801 of system 800 is configured to execute data and instructions stored in memory 803. The data and instructions include deduplication storage engine 201.

In one embodiment, deduplication storage engine 201 performs operations discussed in reference to FIGS. 4-7.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method, comprising:
   determining that a first container of a deduplication storage system is invalid, wherein the first container contains at least a corrupted or missing data segment, wherein the first container stores data segments of the storage system having a plurality of containers, each container having a plurality of compression regions, each compression region having a plurality of data segments compressed and stored therein, including deduplicated segments, wherein at least one deduplicated segment is referenced by a plurality of files, and wherein determining that the first container of the deduplication storage system being invalid includes:
   (i) checking, by a container recovery module during a data scrubbing operation, data integrity of containers of the storage system periodically, and determining the first container being invalid based on the data integrity check of the first container,
   (ii) reading, by a deduplication eliminator during a deduplication operation, the first container of the storage system to locate a data segment, and checking a checksum associated with the first container to determine that the first container is invalid, and
   (iii) looking up, by an indexing module during an indexing operation, an index of the storage system to locate a specific data segment within the first container based on a fingerprint of the specific data segment, the fingerprint being an identifier based on content of the specific data segment, and identifying that the first container including the specific data segment has been marked as invalid, wherein the data scrubbing operation, the deduplication operation, and the indexing operation are performed independently via different threads;
   setting a data recovery state for the first container to be en-queue, which indicates that data of at least one of the data segments needs to be recovered from the first container;
   executing a first process to recover any container having an en-queue data recovery state, and for each of the containers having an en-queue data recovery state, to recover any valid data segment from the corresponding container, including:
   scanning the data segments of the first container to find valid data segments;
   moving or replicating the valid data segments to a second container; and
   setting the data recovery state for the first container to be complete once all the valid data segments are moved or replicated to the second container; and
   executing a second process to scan any container having a complete data recovery state to reclaim storage space, including:
   determining that the data recovery state for the first container is complete;
   copying content of the first container to a file;
   deleting the first container; and
   reclaiming storage space of the first container.

2. The computer-implemented method of claim 1, wherein the second process further comprises:
   checking whether fingerprints associated with the first container are associated with any valid container prior to deleting the first container; and
   reporting a missing data segment corresponding to any data segment with fingerprint not associated with any valid container.

3. The computer-implemented method of claim 1, wherein the second process further comprises:
   sending a fingerprint that is not associated with any valid container to a replication storage, wherein the replication storage searches for a data segment corresponding to the fingerprint within and sends the data segment corresponding to the fingerprint to the storage system if the data segment is in a third container that is valid; and
   writing the received data segment received from the replication storage to the storage system.

4. A storage system, comprising:
   a memory configured to store data and instructions; and
   a processor configured to execute a deduplication storage engine stored in the memory, the deduplication storage engine configured to:
   determine that a first container of a deduplication storage system is invalid, wherein the first container contains at least a corrupted or missing data segment, wherein the first container stores data segments of the storage system having a plurality of containers, each container having a plurality of compression regions, each compression region having a plurality of data segments compressed and stored therein, including deduplicated segments, wherein at least one deduplicated segment is referenced by a plurality of files, and wherein determining that the first container of the deduplication storage system being invalid includes:
- (i) checking, by a container recovery module during a data scrubbing operation, data integrity of containers of the storage system periodically, and determining the first container being invalid based on the data integrity check of the first container,
- (ii) reading, by a deduplication eliminator during a deduplication operation, the first container of the storage system to locate a data segment, and checking a checksum associated with the first container to determine that the first container is invalid, and
- (iii) looking up, by an indexing module during an indexing operation, an index of the storage system to locate a specific data segment within the first container based on a fingerprint of the specific data segment, the fingerprint being an identifier based on content of the specific data segment, and identifying that the first container including the specific data segment has been marked as invalid, wherein the data scrubbing operation, the deduplication operation, and the indexing operation are performed independently via different threads; and set a data recovery state for the first container to be en-queue, which indicates that data of at least one of the data segments needs to be recovered from the first container;

execute a first process to recover any container having an en-queue data recovery state, and for each of the containers having an en-queue data recovery state, to recover any valid data segment from the corresponding container, including:
- scan the data segments of the first container to find valid data segments;
- move or replicate the valid data segments to a second container; and
- set the data recovery state for the first container to be complete once all the valid data segments are moved or replicated to the second container; and execute a second process to scan any container having a complete data recovery state to reclaim storage space, including:
- determining that the data recovery state for the first container is complete;
- copying content of the first container to a file;
- deleting the first container; and
- reclaiming storage space of the first container.

5. The storage system of claim 4, wherein the second process further comprises:
checking whether fingerprints associated with the first container are associated with any valid container prior to deleting the first container; and
reporting a missing data segment corresponding to any data segment with fingerprint not associated with any valid container.

6. A non-transitory computer-readable medium having instructions stored therein, which when executed by a processor, causes the processor to perform operations, the operations comprising:
determining that a first container of a deduplication storage system is invalid, wherein the first container contains at least a corrupted or missing data segment, wherein the first container stores data segments of the storage system having a plurality of containers, each container having a plurality of compression regions, each compression region having a plurality of data segments compressed and stored therein, including deduplicated segments, wherein at least one deduplicated segment is referenced by a plurality of files, and wherein determining that the first container of the deduplication storage system being invalid includes:
- (i) checking, by a container recovery module during a data scrubbing operation, data integrity of containers of the storage system periodically, and determining the first container being invalid based on the data integrity check of the first container,
- (ii) reading, by a deduplication eliminator during a deduplication operation, the first container of the storage system to locate a data segment, and checking a checksum associated with the first container to determine that the first container is invalid, and
- (iii) looking up, by an indexing module during an indexing operation, an index of the storage system to locate a specific data segment within the first container based on a fingerprint of the specific data segment, the fingerprint being an identifier based on content of the specific data segment, and identifying that the first container including the specific data segment has been marked as invalid, wherein the data scrubbing operation, the deduplication operation, and the indexing operation are performed independently via different threads;

setting a data recovery state for the first container to be en-queue, which indicates that data of at least one of the data segments needs to be recovered from the first container;

executing a first process to recover any container having an en-queue data recovery state, and for each of the containers having an en-queue data recovery state, to recover any valid data segment from the corresponding container, including:
- scanning the data segments of the first container to find valid data segments;
- moving or replicating the valid data segments to a second container; and
- setting the data recovery state for the first container to be complete once all the valid data segments are moved or replicated to the second container; and executing a second process to scan any container having a complete data recovery state to reclaim storage space, including:
- determining that the data recovery state for the first container is complete;
- copying content of the first container to a file;
- deleting the first container; and
- reclaiming storage space of the first container.

7. The non-transitory computer-readable medium of claim 6, wherein the second process further comprises:
checking whether fingerprints associated with the first container are associated with any valid container prior to deleting the first container; and reporting a missing data segment corresponding to any data segment with fingerprint not associated with any valid container.

8. The storage system of claim 4, wherein the second process further comprises:
sending a fingerprint that is not associated with any valid container to a replication storage, wherein the replication storage searches for a data segment corresponding to the fingerprint within and sends the data segment corresponding to the fingerprint to the storage system if the data segment is in a third container that is valid; and
writing the received data segment received from the replication storage to the storage system.

9. The non-transitory computer-readable medium of claim 6, wherein the second process further comprises:
sending a fingerprint that is not associated with any valid container to a replication storage, wherein the replication storage searches for a data segment corresponding to the fingerprint within and sends the data segment corresponding to the fingerprint to the storage system if the data segment is in a third container that is valid; and
writing the received data segment received from the replication storage to the storage system.

\* \* \* \* \*